Feb. 21, 1928.
W. V. VAN ETTEN
BRACKET FOR DIRIGIBLE SPOTLIGHTS
Filed May 19, 1926
1,660,057
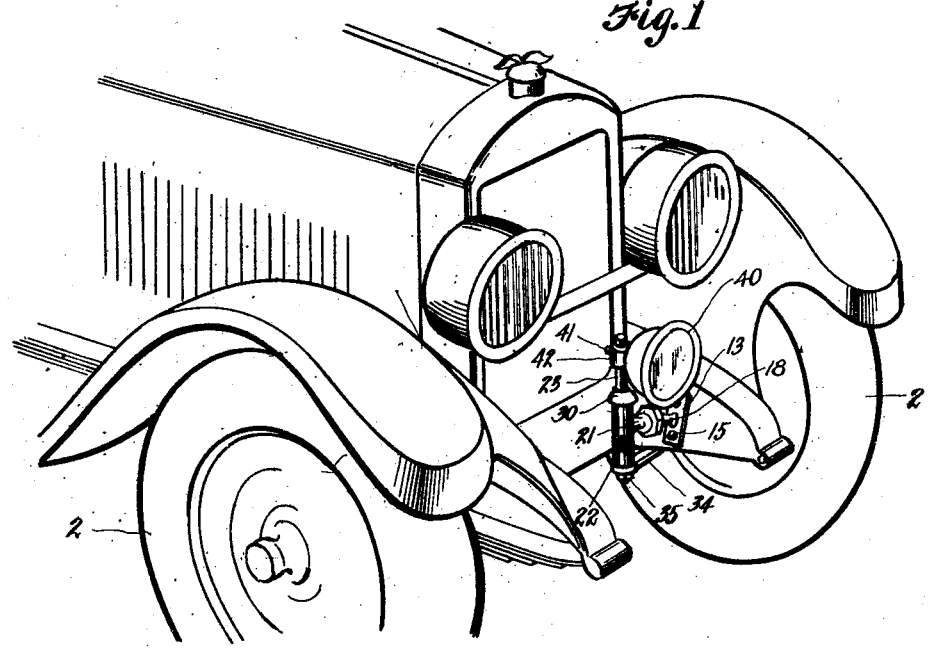
INVENTOR
William V. Van Etten
BY
Richard J Cook
ATTORNEY Patented Feb. 21, 1928.

1,660,057

UNITED STATES PATENT OFFICE.

WILLIAM V. VAN ETTEN, OF EVERETT, WASHINGTON.

BRACKET FOR DIRIGIBLE SPOTLIGHTS.

Application filed May 19, 1926. Serial No. 110,174.

This invention relates to improvements in dirigible spot lights for automobiles and similar types of motor vehicles. More particularly, the invention relates to an adjustable mounting bracket for spot lights and the means whereby the spot light is connected with the steering gear of the vehicle; it being the principal object of the invention to provide a mounting that is adjustable and may be fixed in various positions as is required to adapt the device to various types of vehicles.

More specifically, the object of the invention resides in the provision of a mounting bracket for dirigible spot lights embodying a ball and socket joint between the attaching and light supporting parts which permits the bracket to be fixed at various positions and the light mounting standard to be adjusted to and maintained in vertical position, or at other desired positions.

In accomplishing these and other objects of the invention, I have provided the improved details of construction, the preferred forms of which are illustrated in the accompanying drawings, wherein—

Figure 1 is a perspective view of an automobile equipped with a dirigible spot light supported by means of an adjustable bracket embodied by the present invention.

Figure 2 is a sectional, detail view of the lamp mounting.

Figure 3 is a plan view, showing the means of attaching the lamp actuating lever to the steering gear of the vehicle.

Figure 4 is a detail view of an alternative form of supporting bracket of rigid construction.

Referring more in detail to the drawings—

1 designates what may be an automobile of any of the ordinary types of construction, having front, steering wheels 2 mounted on the spindles of steering knuckles 3 at the ends of an axle 4; the knuckles being mounted in the usual manner by means of pivot pins 5 (see Figure 4) and are equipped with rearwardly directed steering arms 6 connected by a cross rod 7. The steering arm 6 of the left hand wheel is provided with an inwardly and forwardly curved extension arm 8 to which a steering shaft 9 is pivotally connected. The shaft 9, at its rearward end, operatively connects with the vehicle steering gear, not shown, and it moves forwardly and rearwardly substantially in parallel relation to the adjacent side beam 10 of the vehicle frame in accordance with movement of the steering gear to direct the course of the vehicle from one side to the other.

At the front of the vehicle is an apron 11 that is fixed along the inner sides of the forward ends of the side beams of the vehicle frame and also extends across the front of the vehicle below the radiator and it is to the left hand forward portion of this apron that the present spot light is intended to be attached and it is due to the fact that in different types or makes of vehicles these aprons assume various shapes, the mounting bracket for the spot light must necessarily be adjustable in order that the light supporting standard may be adjusted to a vertical position regardless of the inclination or disposition of the base or attaching part thereof.

In its preferred form, the mounting bracket comprises a flat base or attaching plate 13 adapted to be disposed flatly against the inner face of the apron 11, as shown in Figure 2, and to be secured thereto by means of bolts 14 and 15 extended through the plate and through the apron; the bolt 14 being extended also through the channel iron beam 10 and both bolts are equipped with nuts 16 at their ends whereby they are drawn tight and held secure. Mounted centrally on the plate 13 is a shank 18 terminating at its outer end in a roughened ball 19 and fitted over this ball is the socketed end portion 20 of an arm, or shank, 21 that extends laterally from a vertically disposed sleeve bearing 22. The socketed member, which is semi-spherical in form, may be clamped tightly against the ball so as to hold the bearing sleeve rigid with respect to the mounting member 13, by means of a lock nut 25 which is fitted about the shank 18 and to the inner portion of the ball 19 and which threads onto the socketed member. With this provision, the bearing 22 may be adjusted to and then clamped and held in vertical position regardless of the position at which the supporting plate 13 is required to be fixed.

A standard 23 is contained revolubly within the bearing sleeve 22 and is supported therein by means of a nut 30 threaded onto its upper end portion. This nut rests on anti-friction bearings 31 carried in a raceway 32 in the upper end of the sleeve. At its lower end, the standard has an actuating lever 34 fixed thereto by means of a nut 35 and a coiled spring 36 contained within a counterbore 37 in the lower end of the bearing presses against the shoulder 38 at the base of the counterbore in order to retain the parts against vibration.

Mounted on the upward end of the standard 23 is a spot light 40 which may be of any desirable type and which may be held at various positions by means of a set screw 41 threaded through its mounting member 42 and against the standard.

The steering lever 34 that is fixed to the lower end of the standard extends laterally beneath the mounting portion of the apron and beam 10 and is pivotally connected at its outer end, preferably by a ball and socket connection as designated at 43, with the forward end portion of a connecting link 45 that extends laterally beneath the beam 10 and is then turned rearwardly to extend adjacent the steering shaft 9 and is rigidly connected therewith so that forward and rearward movement of the shaft 9 that actuates the steering wheels to guide the car toward one side or the other also rotates the spot light standard 23 to turn the light accordingly, so that the rays of light therefrom will follow the direction of travel of the vehicle.

The mounting shown in Figure 4, which is an alternative construction designed for aprons of a certain definite form, comprises a bearing sleeve 50 provided with two laterally directed, rigid arms 51 and 52 that may be bolted to the apron.

Having thus described my invention, what I claim as new therein and desire to secure by Letters-Patent, is:

1. The combination with an automobile and its steering gear, of a dirigible spot light comprising a base plate adapted to be rigidly fixed to a part of the vehicle, a bearing sleeve adjustably supported from the base member by means of a ball and socket joint, means for locking the parts of the joint against relative movement, a standard revoluble in the sleeve, a spot light mounted on the upper end of the standard, a lever fixed to the lower end of the standard and means connecting the lever with the steering gear of the vehicle.

2. The combination with an automobile and its steering gear, of a dirigible spot light comprising a mounting base adapted to be fixed to the apron at the front of the vehicle, a shank extended from the base having a ball at the end, a bearing sleeve provided with a laterally extending shank formed with a socket adapted to receive the ball, a lock nut adapted to lock the socketed shank on the ball at different positions of adjustment, a standard revolubly mounted in the sleeve, a spot light mounted on the standard, a lever fixed to the lower end of the standard and a link connecting the lever with the steering gear of the vehicle.

Signed at Seattle, Washington, this 26th day of April, 1926.

WILLIAM V. VAN ETTEN.